US012634476B2

(12) United States Patent (10) Patent No.: US 12,634,476 B2
Jeon et al. (45) Date of Patent: May 19, 2026

(54) VIDEO ENCODING AND DECODING METHOD FOR ADAPTIVELY DETERMINING CHROMA INTRA DIRECTIONAL PREDICTION MODE

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Byeung Woo Jeon, Seongnam-si (KR); Jee Yoon Park, Seoul (KR); Bum Yoon Kim, Yongin-si (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 298 days.

(21) Appl. No.: 18/035,786

(22) PCT Filed: Nov. 16, 2021

(86) PCT No.: PCT/KR2021/016750
§ 371 (c)(1),
(2) Date: Nov. 6, 2023

(87) PCT Pub. No.: WO2022/103240
PCT Pub. Date: May 19, 2022

(65) Prior Publication Data
US 2024/0114148 A1 Apr. 4, 2024

(30) Foreign Application Priority Data

Nov. 16, 2020 (KR) ........................ 10-2020-0152972
Nov. 16, 2021 (KR) ........................ 10-2021-0157410

(51) Int. Cl.
H04N 19/159 (2014.01)
H04N 19/176 (2014.01)
H04N 19/186 (2014.01)
(52) U.S. Cl.
CPC ......... *H04N 19/159* (2014.11); *H04N 19/176* (2014.11); *H04N 19/186* (2014.11)
(58) Field of Classification Search
None
See application file for complete search history.

(56) References Cited

U.S. PATENT DOCUMENTS 9,918,106 B2 * 3/2018 Kim ..................... H04N 19/174
10,455,228 B2 10/2019 Seregin et al.
(Continued)

FOREIGN PATENT DOCUMENTS

KR 20180122361 A 11/2018
KR 20190042090 A 4/2019
(Continued)

OTHER PUBLICATIONS

An English translation of KR 1020200087088 A.*
International Search Report cited in corresponding Application No. PCT/KR2021/016750; Feb. 18, 2022; (4 pages).

*Primary Examiner* — Mohammad J Rahman
(74) *Attorney, Agent, or Firm* — Lempia Summerfield Katz LLC

(57) ABSTRACT

A video encoding method and a video decoding method are provided for adaptively determining a chroma intra-directional prediction mode. When a DM mode is applied for intra prediction of a chroma signal, the video encoding
(Continued)

method and the video decoding method adaptively modify the directional mode of a luma block to conform to the characteristics of a chroma block by considering the position and size of the chroma block, the presence of reference samples, and the size of the luma block. The video encoding method and the video decoding method use the modified directional mode for intra prediction of the chroma signal.

5 Claims, 16 Drawing Sheets

(56) References Cited

U.S. PATENT DOCUMENTS

| | | | |
|---|---|---|---|
| 10,567,759 B2 | 2/2020 | Seregin et al. | |
| 10,609,402 B2 | 3/2020 | Zhao et al. | |
| 10,834,387 B2 | 11/2020 | Racape et al. | |
| 11,259,039 B2 | 2/2022 | Zhao et al. | |
| 11,363,254 B2 | 6/2022 | Racape et al. | |
| 11,595,642 B2 * | 2/2023 | Jang | H04N 19/11 |
| 2015/0043641 A1 * | 2/2015 | Gamei | H04N 19/136 |
| | | | 375/240.12 |
| 2017/0272748 A1 * | 9/2017 | Seregin | H04N 19/159 |
| 2017/0272759 A1 | 9/2017 | Seregin et al. | |
| 2019/0273918 A1 | 9/2019 | Racape et al. | |
| 2019/0342568 A1 | 11/2019 | Zhao et al. | |
| 2020/0036985 A1 | 1/2020 | Jang et al. | |
| 2020/0195949 A1 | 6/2020 | Zhao et al. | |
| 2020/0413041 A1 | 12/2020 | Racape et al. | |
| 2021/0092394 A1 * | 3/2021 | Tsai | H04N 19/172 |
| 2021/0250577 A1 * | 8/2021 | Leleannec | H04N 19/96 |
| 2022/0060728 A1 | 2/2022 | Zhao et al. | |
| 2022/0078405 A1 * | 3/2022 | Francois | H04N 19/70 |
| 2022/0116636 A1 * | 4/2022 | Kang | H04N 19/44 |
| 2022/0150479 A1 * | 5/2022 | Rosewarne | H04N 19/107 |
| 2022/0150509 A1 * | 5/2022 | Rosewarne | H04N 19/18 |
| 2022/0224884 A1 * | 7/2022 | Kim | H04N 19/132 |
| 2022/0272329 A1 * | 8/2022 | Jang | H04N 19/11 |
| 2022/0279173 A1 * | 9/2022 | Chiang | H04N 19/119 |
| 2022/0312000 A1 * | 9/2022 | Racape | H04N 19/176 |
| 2022/0398455 A1 * | 12/2022 | Dumas | H04N 19/436 |
| 2023/0007263 A1 * | 1/2023 | Kang | H04N 19/159 |
| 2023/0254507 A1 * | 8/2023 | Dumas | H04N 19/176 |
| | | | 375/240.12 |

FOREIGN PATENT DOCUMENTS

| | | |
|---|---|---|
| KR | 20190053257 A | 5/2019 |
| KR | 20200087088 A | 7/2020 |
| KR | 20200125724 A | 11/2020 |

* cited by examiner

VIDEO ENCODING AND DECODING METHOD FOR ADAPTIVELY DETERMINING CHROMA INTRA DIRECTIONAL PREDICTION MODE

CROSS-REFERENCE TO RELATED APPLICATIONS

This application is a U.S. national stage of International Application No. PCT/KR2021/016750, filed on Nov. 16, 2021, which claims priority to Korean Patent Application No. 10-2020-0152972 filed on Nov. 16, 2020, and Korean Patent Application No. 10-2021-0157410 filed on Nov. 16, 2021, the entire disclosures of each of which are incorporated herein by reference.

TECHNICAL FIELD

The present disclosure in some embodiments relates to video encoding and decoding methods for adaptively determining a chroma intra directional prediction mode.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher encoding efficiency and an improved image enhancement effect than existing compression techniques is required.

In image (video) encoding/decoding, intra prediction modes frequently used or mostly used to maintain video quality during encoding of chroma blocks are Planar, DC, Vertical, Horizontal, and DM modes. Here, the DM mode is a technique that uses the intra prediction mode of a luma block spatially corresponding to the chroma block as the intra prediction mode of the current chroma block. The DM mode is the only method that the chroma block may use for prediction in various angles except for vertical and horizontal directions. Therefore, in video encoding/decoding, it is necessary to consider refining the operation in the DM mode to improve the encoding efficiency of the chroma block.

SUMMARY

The present disclosure in some embodiments seeks to provide a video encoding method and a video decoding method. When a DM mode is applied for intra prediction of the chroma signal, the video encoding method and the video decoding method adaptively modify the directional mode of a luma block to conform to the characteristics of a chroma block by considering the position and size of the chroma block, the presence of reference samples, and the size of the luma block. The video encoding method and the video decoding method use the modified directional mode for intra prediction of a chroma signal.

At least one aspect of the present disclosure provides an intra prediction method performed by a video decoding apparatus. The method comprises decoding a chroma intra prediction mode indicator from a bitstream, wherein the chroma intra prediction mode indicator indicates whether a prediction mode of a chroma block is a DM mode. The method also comprises decoding a luma intra prediction mode from the bitstream, wherein the luma intra prediction mode represents an intra prediction mode of a luma block spatially corresponding to the chroma block. The method also comprises generating a chroma intra prediction mode, which is the intra prediction mode of the chroma block, based on whether the chroma block is included in a modification set when the chroma intra prediction mode indicator is the DM mode. Here, the generating the chroma intra prediction mode comprises generating the chroma intra prediction mode based on the luma intra prediction mode, the aspect ratio of the luma block, and the aspect ratio of the chroma block when the chroma block is included in the modification set.

Another aspect of the present disclosure provides a video decoding apparatus. The video decoding apparatus comprises an entropy decoder configured to decode a chroma intra prediction mode indicator and a luma intra prediction mode from a bitstream. The chroma intra prediction mode indicator indicates whether a prediction mode of a chroma block is a DM mode. The luma intra prediction mode represents an intra prediction mode of a luma block spatially corresponding to the chroma block. The video decoding apparatus also comprises an intra predictor configured to generate a chroma intra prediction mode, which is the intra prediction mode of the chroma block, based on whether the chroma block is included in a modification set when the chroma intra prediction mode indicator is the DM mode. Here, the intra predictor is also configured to generate the chroma intra prediction mode based on the luma intra prediction mode, the aspect ratio of the luma block, and the aspect ratio of the chroma block when the chroma block is included in the modification set.

Yet another aspect of the present disclosure provides an intra prediction method performed by a video encoding apparatus. The method comprises obtaining a chroma intra prediction mode indicator, wherein the chroma intra prediction mode indicator indicates whether a prediction mode of a chroma block is a DM mode. The method also comprises obtaining a luma intra prediction mode, wherein the luma intra prediction mode represents an intra prediction mode of a luma block spatially corresponding to the chroma block. The method also comprises generating a chroma intra prediction mode, which is the intra prediction mode of the chroma block, based on whether the chroma block is included in a modification set when the chroma intra prediction mode indicator is the DM mode. Here, the generating the chroma intra prediction mode comprises generating the chroma intra prediction mode based on the luma intra prediction mode, the aspect ratio of the luma block, and the aspect ratio of the chroma block when the chroma block is included in the modification set.

As described above, the present embodiment provides a video encoding method and a video decoding method. When the DM mode is applied for intra prediction of a chroma signal, the video encoding method and the video decoding method adaptively modify the directional mode of a luma block to conform to the characteristics of a chroma block by considering the position and size of the chroma block, the presence of reference samples, and the size of the luma block. The video encoding method and the video decoding method use the modified directional mode for intra prediction of the chroma signal and thus may improve the encoding efficiency and subjective video quality.

DETAILED DESCRIPTION

Figure 1:
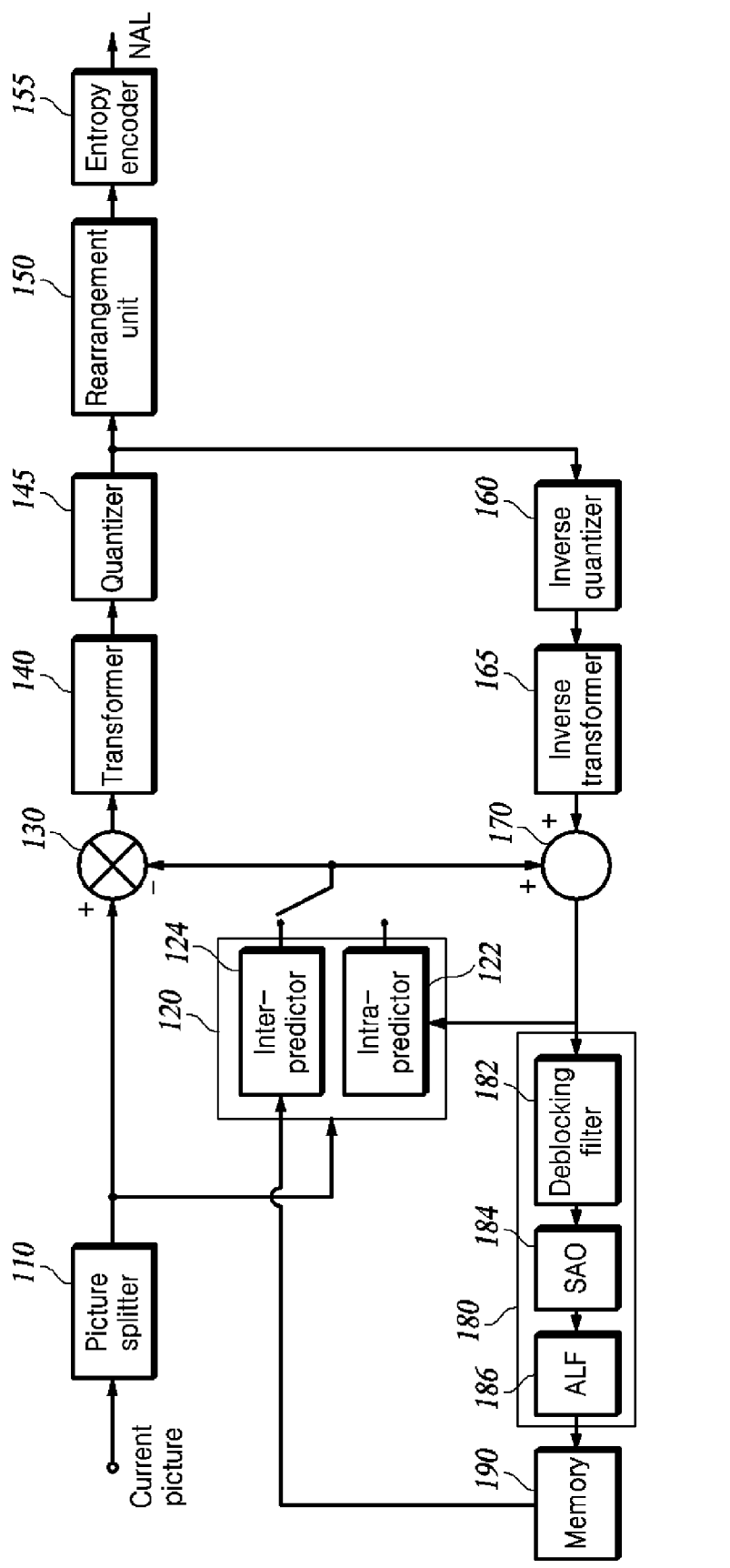
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, a detailed description of related known components and functions when considered to obscure the subject of the present disclosure has been omitted for the purpose of clarity and for brevity.

FIG. 1 is a block diagram for a video encoding apparatus which may implement technologies of the present disclosure. Hereinafter, referring to illustration of FIG. 1, the video encoding apparatus and sub-components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as the software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a CTU. Information on the size of the CTU (CTU size) is encoded as the syntax of the SPS or the PPS and delivered to a video decoding apparatus.

The picture splitter 110 splits each picture constituting the video into a plurality of CTUs having a predetermined size and then recursively splits the CTU by using a tree structure. A leaf node in the tree structure becomes the CU, which is a basic unit of encoding.

The tree structure may be a quadtree (QT) in which a higher node (or a parent node) is split into four lower nodes (or child nodes) having the same size. The tree structure may be a binarytree (BT) in which the higher node is split into two lower nodes. The tree structure may be a ternarytree (TT) in which the higher node is split into three lower nodes at a ratio of 1:2:1. The tree structure may be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
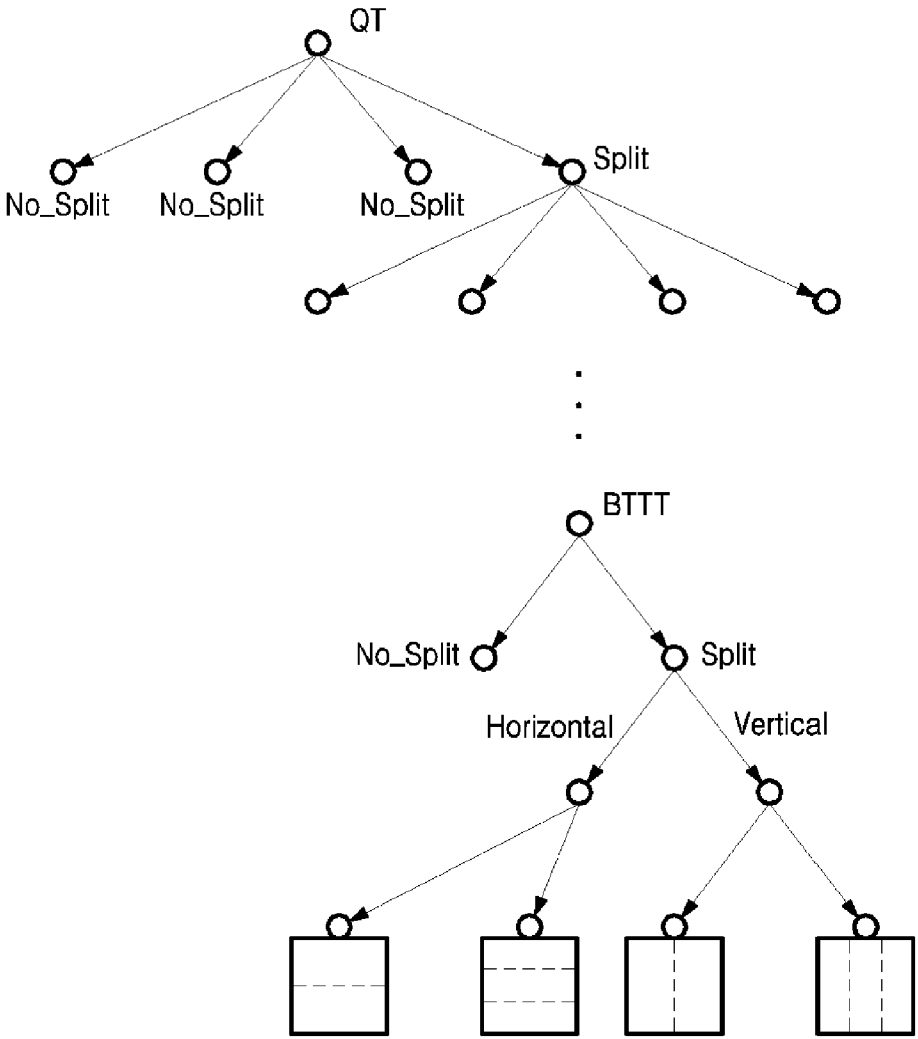
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., in a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
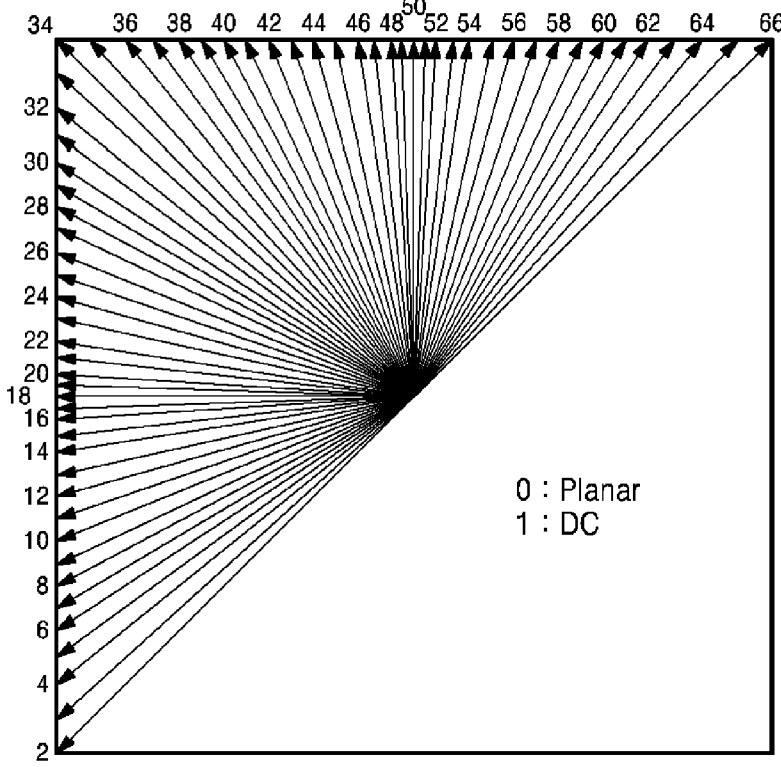
FIGS. 3A and 3B illustrate a plurality of intra prediction modes including wide-angle intra prediction modes.

The intra predictor 122 predicts pixels in the current block by using pixels (reference pixels) positioned on a neighboring of the current block in the current picture including the current block. There is a plurality of intra prediction modes according to the prediction direction. For example, as illustrated in FIG. 3A, the plurality of intra prediction modes may include 2 non-directional modes including a planar mode and a DC mode and may include 65 directional modes.

A neighboring pixel and an arithmetic equation to be used are defined differently according to each prediction mode.

Figure 3B:
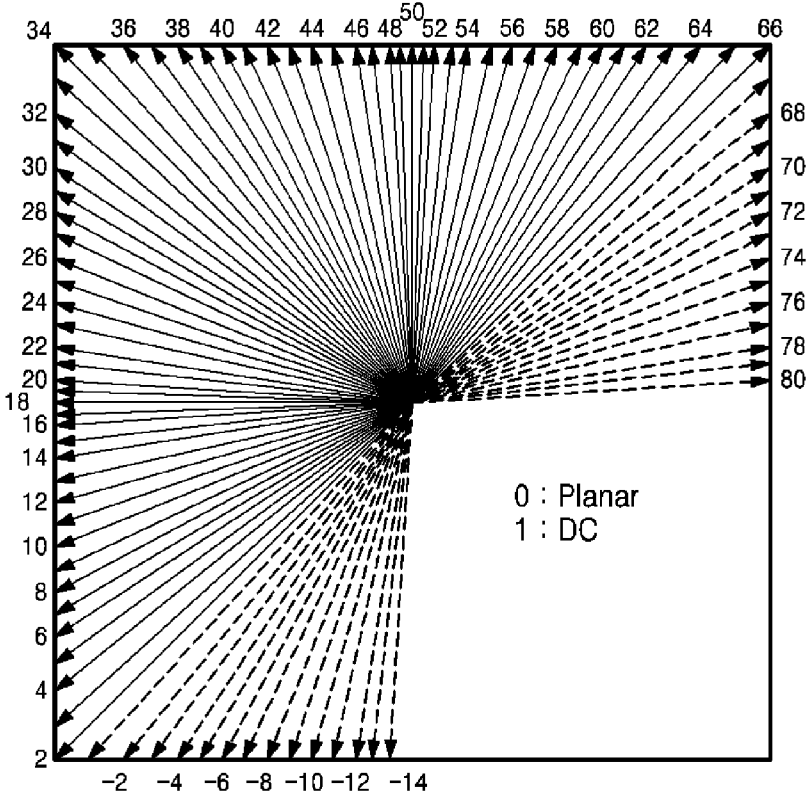

For efficient directional prediction for the current block having the rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
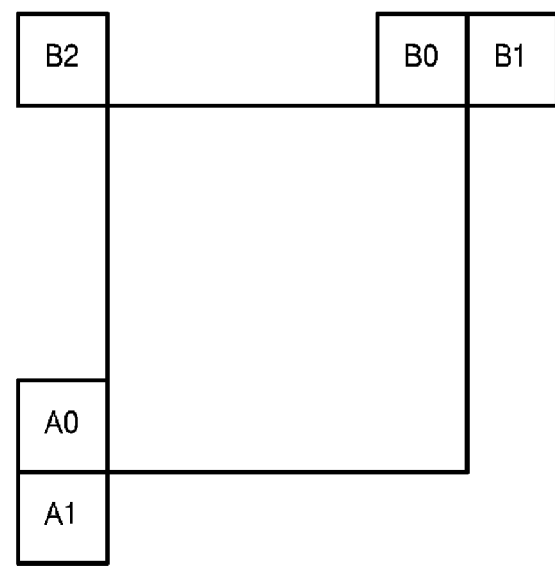
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

The merge skip mode is a special case of the merge mode. After quantization, when all transform coefficients for entropy encoding are close to zero, only the neighboring block selection information is transmitted without transmitting a residual signal. By using the merge skip mode, it is possible to achieve a relatively high encoding efficiency for images with slight motion, still images, screen content images, and the like.

Hereafter, the merge mode and the merge skip mode are collectively called the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms a residual signal in a residual block having pixel values of a spatial domain into a transform coefficient of a frequency domain. The transformer 140 may transform residual signals in the residual block by using a total size of the residual block as a transform unit or also split the residual block into a plurality of sub-blocks and perform the transform by using the sub-block as the transform unit. Alternatively, the residual block is divided into two sub-blocks, which are a transform area and a non-transform area to transform the residual signals by using only the transform area sub-block as the transform unit. Here, the transform area sub-block may be one of two rectangular blocks having a size ratio of 1:1 based on a horizontal axis (or vertical axis). In this case, a flag (cu_sbt_flag) indicates that only the sub-block is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area sub-block may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), Exponential Golomb, etc.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block are used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating a difference between the restored pixel and an original pixel, which occurs due to lossy coding. The SAO filter 184 applies an offset as a CTU unit to enhance a subjective image quality and encoding efficiency. Contrary to this, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
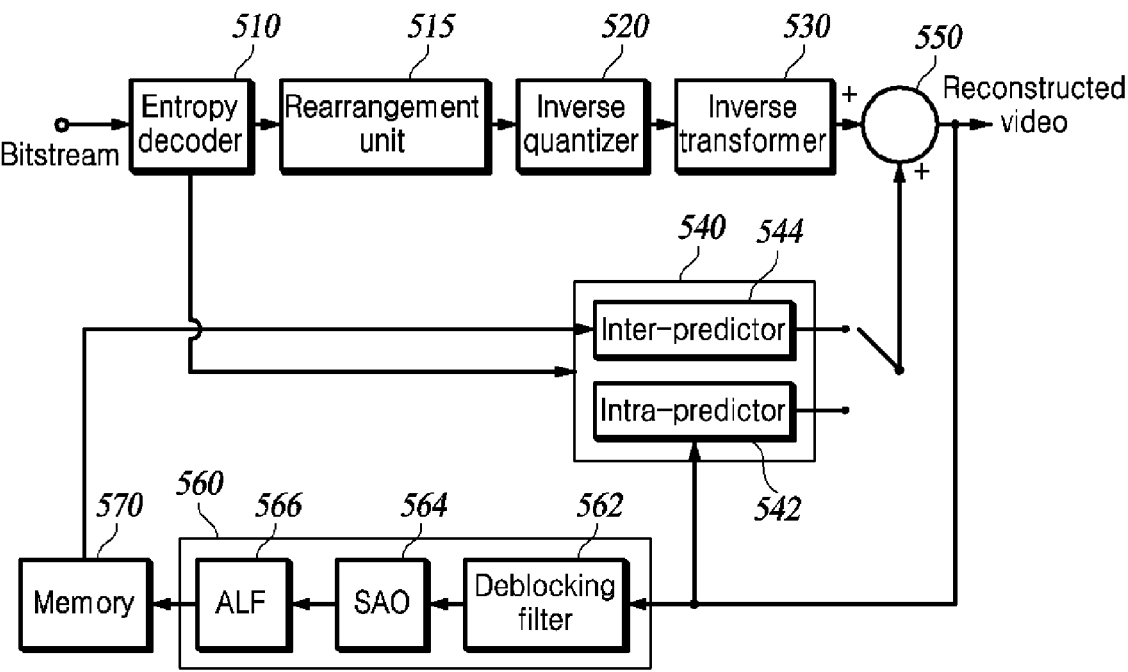
FIG. 5 is a block diagram of a video decoding apparatus that may implement the techniques of the present disclosure.

FIG. 5 is a functional block diagram for a video decoding apparatus, which may implement the technologies of the present disclosure. Hereinafter, referring to FIG. 5, the video decoding apparatus and sub-components of the apparatus are described.

The video decoding apparatus may be configured to include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU is extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (MTT_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (sub-block) of the transform block, the inverse transformer 530 extracts a flag (cu_sbt_flag) that only the sub-block of the transform block is transformed, directional (vertical/horizontal) information (cu_sbt_hori-zontal_flag) of the sub-block, and/or positional information (cu_sbt_pos_flag) of the sub-block. The inverse transformer 530 also inversely transforms the transform coefficients of the corresponding sub-block into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transform unit and the prediction block output from the inter prediction unit or the intra prediction unit. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate a difference between the restored pixel and an original pixel, which occurs due to lossy coding. The filter coefficient of the ALF is determined by using information on a filter coefficient decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present embodiment relates to encoding and decoding of an image (video) described above. More specifically, the present embodiment provides a video encoding method and a video decoding method. When a DM mode is applied for intra prediction of a chroma signal, the video encoding method and the video decoding method adaptively modify the directional mode of a luma block to conform to the characteristics of a chroma block by considering the position and size of the chroma block, the presence of reference samples, and the size of the luma block. The video encoding method and the video decoding meth use the modified directional mode for intra prediction of the chroma signal.

The following embodiments may be performed by the intra predictor 122 of the video encoding apparatus and the intra predictor 542 of the video decoding apparatus. In the following description, to avoid repeated descriptions, the present embodiment is described from the perspective of the intra predictor 542 within the video decoding apparatus.

In what follows, the current block includes a current luma block and a current chroma block.

Also, the aspect ratio of a luma block or a chroma block is defined as a value obtained by dividing the horizontal length of the block by the vertical length thereof.

I. Intra Prediction Mode of Chroma Block

The intra prediction mode of the luma block has fine-divided directional modes in addition to the non-directional mode, as illustrated in FIGS. 3A and 3B. Meanwhile, depending on the prediction direction used by the luma block, the chroma block may also use the intra prediction of the fine-divided directional mode restrictively. However, for intra prediction of the chroma block, other than the horizontal and vertical directions, various directional modes provided for the luma block may not always be available. The prediction mode of the current chroma block should be set to the DM mode to use the various directional modes. By setting the prediction mode to the DM mode, the current chroma block may use a directional mode in addition to the horizontal and vertical modes of the luma block.

During the encoding of a chroma block, the intra prediction modes frequently used or mostly used to maintain video quality are Planar, DC, Vertical, Horizontal, and DM modes. Here, in the DM mode, the intra prediction mode of a luma block spatially corresponding to the current chroma block is used as the intra prediction mode of the current chroma block.

The video encoding apparatus may signal to the video decoding apparatus whether the intra prediction mode of the chroma block is the DM mode. Here, various methods may be employed for transmitting the DM mode to the video decoding apparatus. For example, the video encoding apparatus may indicate whether the intra prediction mode is the DM mode by setting intra_chroma_pred_mode, which is the information indicating the intra prediction mode of the chroma block, to a specific value and by transmitting the information to the video decoding apparatus.

When the chroma block is encoded in the intra prediction mode, the intra predictor 542 of the video decoding apparatus may set the intra prediction mode IntraPredModeC of the chroma block according to Table 1.

In the following description, to distinguish between intra_chroma_pred_mode and IntraPredModeC, which are the information related to the intra prediction mode of the chroma block, the modes are termed as the chroma intra prediction mode indicator and the chroma intra prediction mode, respectively.

TABLE 1

| | lumaIntraPredMode | | | | |
|---|---|---|---|---|---|
| intra_chroma_pred_mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

Here, lumaIntraPredMode is an intra prediction mode (in what follows, 'luma intra prediction mode') of the luma block corresponding to the current chroma block. lumaIntraPredMode indicates one of the prediction modes illustrated in FIG. 3A. For example, in Table 1, lumaIntraPredMode=0 indicates the Planar prediction mode, and lumaIntraPredMode=1 indicates the DC prediction mode. The lumaIntraPredMode 18, 50, and 66 indicate the directional modes referred to as horizontal, vertical and VDIA, respectively. On the other hand, intra_chroma_pred_mode 0, 1, 2, and 3, respectively, indicate the Planar, vertical, horizontal, and DC prediction modes. When intra_chroma_pred_mode=4, it indicates the DM mode, and the IntraPredModeC value, which is the chroma intra prediction mode, is set to the same value as the lumaIntraPredMode value.

In the following description, a process for setting the chroma intra prediction mode IntraPredModeC using the value of intra_chroma_pred_mode according to Table 1 is further described. First, it is assumed that the luma intra prediction mode lumaIntraPredMode is mode 50 corresponding to the vertical direction. Next, a case where intra_chroma_pred_mode transmitted through a bitstream is 1, indicating the vertical direction, is addressed. Although lumaIntraPredMode indicates the vertical mode, since intra_chroma_pred_mode indicates the vertical direction without the DM mode being indicated, the intra predictor 542 may set the IntraPredModeC as a specific mode 66 according to Table 1. On the other hand, when intra_chroma_pred_mode is 2 and indicates the horizontal direction, the intra predictor 542 may set the intra prediction mode of the chroma block to mode 18 corresponding to the horizontal direction as indicated.

By using the settings according to Table 1, the video encoding apparatus may effectively transmit whether the intra prediction mode is the DM mode to the video decoding apparatus. Also, when the intra prediction mode is not the DM mode, the video encoding apparatus may use a separate mode (i.e., prediction mode 66) in addition to the Planar, vertical, horizontal, and DC modes without additional bit allocation and thus may improve the compression rate.

In the following description, a method for setting IntraPredModeC, which is the intra prediction mode of the current chroma block, by the intra predictor 542 with reference to the intra_chroma_pred_mode value and the lumaIntraPredMode value as shown in Table 1 is described.

Figure 6:
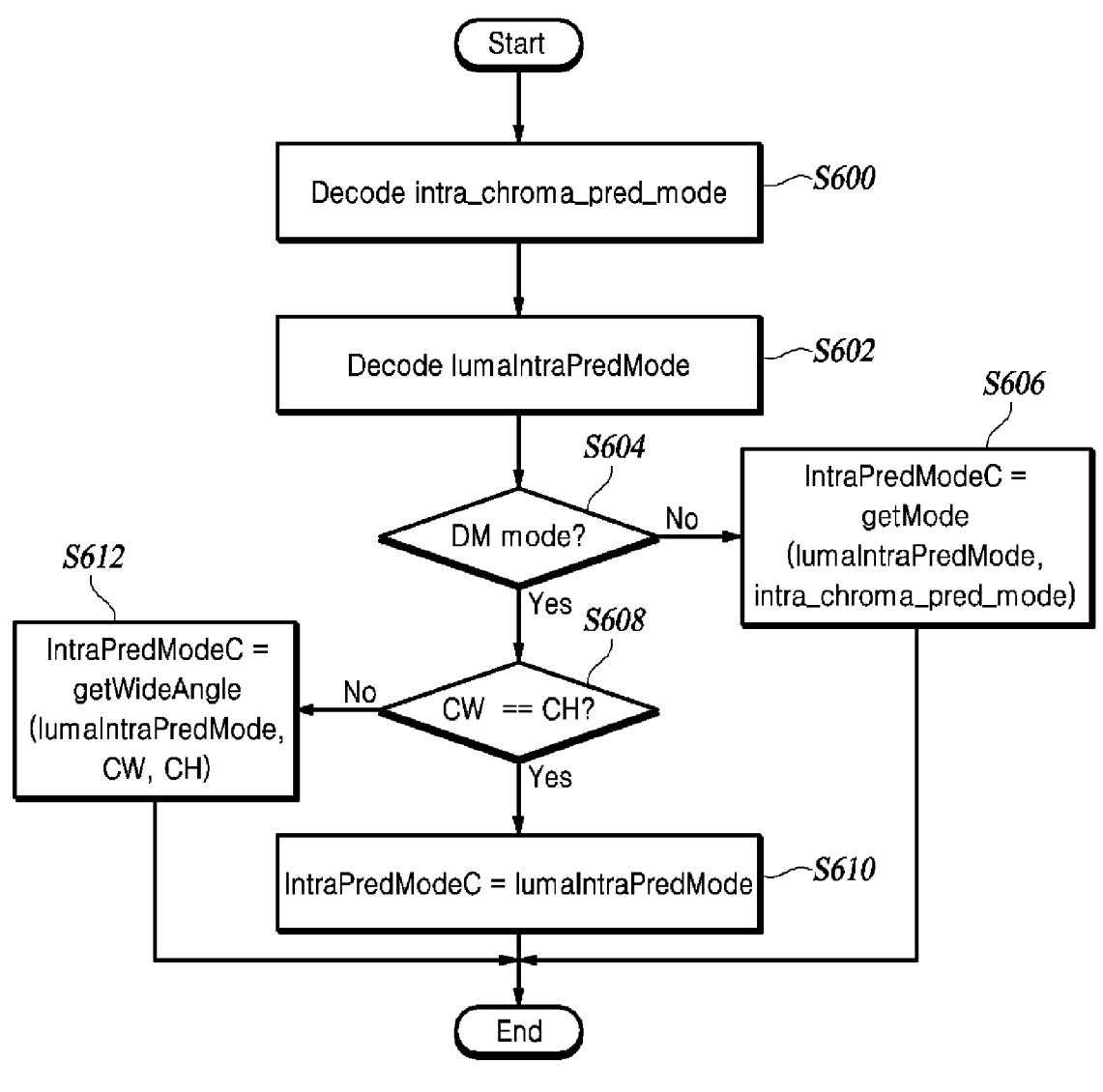
FIG. 6 is a flow diagram illustrating a method for setting the intra prediction mode of a chroma block by a video decoding apparatus according to one embodiment of the present disclosure.

FIG. 6 is a flow diagram illustrating a method for setting the intra prediction mode of a chroma block by a video decoding apparatus according to one embodiment of the present disclosure.

The entropy decoder 510 within the video decoding apparatus decodes intra_chroma_pred_mode from a bitstream (S600).

The entropy decoder 510 obtains lumaIntraPredMode from a bitstream (S602).

The intra predictor 542 within the video decoding apparatus checks whether the chroma intra prediction mode indicator is the DM mode (S604). For example, according to Table 1, when intra_chroma_pred_mode=4, the intra predictor 542 determines the intra prediction mode of the chroma block as the DM mode, otherwise the intra predictor 542 determines that the intra prediction mode is not the DM mode.

When the chroma intra prediction mode indicator is not the DM mode (No in S604), the intra predictor 542 sets IntraPredModeC using the getMode( ) function (S606). In the getMode( ) function, as shown in Table 1, IntraPredModeC may be set with reference to the intra_chroma_pred_mode value and the lumaIntraPredMode value.

When the chroma intra prediction mode indicator is the DM mode (Yes in S604), to check whether the prediction mode corresponds to the wide-angle intra prediction mode, the intra predictor 542 checks whether the horizontal length CW of the current chroma block is equal to the vertical length CH thereof (S608).

When CW==CH, in other words, when the chroma block is square (Yes in S608), the intra predictor 542 sets the value of the chroma intra prediction mode IntraPredModeC to the value of the luma intra prediction mode lumaIntraPredMode (S610).

On the other hand, when CW!=CH (No in S608), in other words, when the chroma block is rectangular, the intra predictor 542 sets the value of IntraPredModeC of the chroma block to the value obtained by changing the lumaIntraPredMode using the getWideAngle( ) function (S612).

In the following description, the operation of the getWideAngle( ) function is described.

Figure 7:
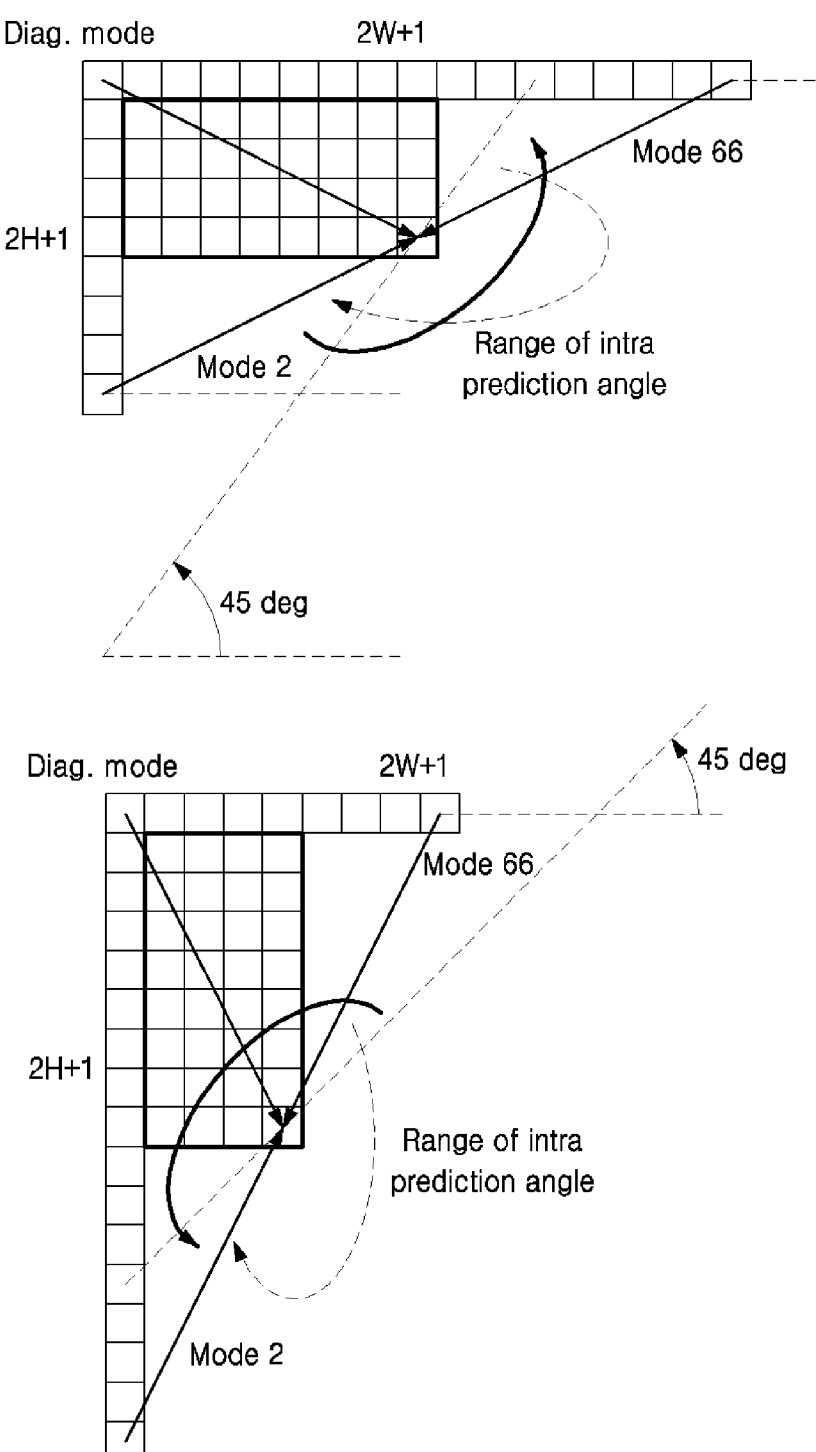
FIG. 7 conceptually illustrates wide-angle intra prediction according to one embodiment of the present disclosure.

The Chroma Separate Tree (CST) refers to a technique for allowing a luma block and a chroma block to have different splitting structures. Also, as described above, as the block splitting method is extended to support the QT and MTT-based splitting methods, the current block may have a rectangular shape. As shown in FIG. 7, Wide-angle Intra Prediction (WAIP) is a technique that reflects the extension of the CST technique and the splitting method and determines a prediction direction by taking account of the aspect ratio of a block.

The intra predictor 542 may modify the intra prediction mode according to the shape of the current block by using the wide-angle intra prediction, where the getWideAngle( ) function may perform the modification process.

Meanwhile, the getWideAngle( ) function may be applied to both the luma and chroma blocks.

The getWideAngle( ) function takes three input arguments. The first input argument is the intra prediction mode, which is expressed as pred_mode_intra for the sake of convenience. The other two input arguments are the horizontal length nW and the vertical length nH of the corresponding block. In the example of FIG. 6, CW and CH represent the horizontal and vertical lengths of the chroma block, respectively. Therefore, when the getWideAngle( ) function is called, nW and nH are used as variables that receive CW and CH values, respectively.

The getWideAngle( ) function receives pred_mode_intra and outputs a changed pred_mode_intra value as follows for a rectangular block satisfying the condition that nW!=nH.

First, if all three conditions shown in Eq. 1 are true, the getWideAngle( ) function provides 'pred_mode_intra+65' as an output.

i) nW>nH, ii) pred_mode_intra>=2 iii) pred_mode_intra<((whRatio>1)?(8+2·whRatio):8)   [Eq. 1]

In Eq. 1, whRatio representing the aspect ratio is expressed by whRatio=abs(Log 2(nW/nH)), and Log 2( ) represents the logarithm function with a base of 2.

Meanwhile, if all three conditions shown in Eq. 2 are true, the getWideAngle( ) function provides 'pred_mode_intra-67' as an output.

i) nW<nH ii) pre_mod_intra<=66 iii) pred_mode_intra>((whRatio>1)?(60−2·whRatio):
   60)   [Eq. 2]

For example, the following describes a case in which the intra prediction mode (lumaIntraPredMode) of a 16×4 chroma block (i.e., nW=16, nH=4) is 4, and the getWideAngle( ) function is called in the form of getWideAngle (lumaIntraPredMode, CW, CH). In the getWideAngle( ) function, pred_mode_intra is set to 4, and whRatio becomes 2. Also, since the horizontal length is greater than the vertical length (that is, nW>nH) and the condition iii) of Eq. 1 is satisfied, the getWideAngle( ) function outputs 69 corresponding to the sum of 4 and 65. Accordingly, after modifying IntraPredModeC to mode 69 (the S612 step of FIG. 6), the intra predictor 542 may use the modified mode for intra prediction of the chroma block. Accordingly, the video decoding apparatus modifies the lumaIntraPredMode value transmitted as index 4 by the video encoding apparatus to mode 69 and then uses the mode for intra prediction. In other words, although the video encoding apparatus signals that lumaIntraPredMode=4, the video decoding apparatus modifies the lumaIntraPredMode value to mode 69 by considering the aspect ratio of the current block and then uses the mode for intra prediction.

As a result, in the example of FIG. 6, in the DM mode, the getWideAngle( ) function may modify the value of lumaIntraPredMode according to whether the horizontal length of the chroma block is longer than the vertical length thereof, and the intra predictor 542 may use the modified value as the intra prediction mode of the chroma block.

On the other hand, depending on the use of the CST technique, the relevance between the aspect ratio of a chroma block and the aspect ratio of the corresponding luma block may be significantly lowered. In other words, even if the chroma block is longer horizontally, the corresponding luma block may be horizontally longer, vertically longer, or square. Accordingly, based on the aspect ratio of the chroma block or the luma block, an intra prediction mode in which the value of lumaIntraPredMode of the luma block is used without a change and an intra prediction mode in which the value of lumaIntraPredMode is used after being modified may be defined. The intra prediction of a chroma block shown in FIG. 6 does not consider the significant irrelevance between the aspect ratio of a chroma block and the aspect ratio of the corresponding luma block and uses only the aspect ratio of the chroma block, by which encoding efficiency may deteriorate.

II. Improvement of DM Mode Among Intra Prediction Modes

In the following description, in using the DM mode in which a chroma block shares the intra prediction mode of a luma block when the CST technique is employed, an embodiment for more accurately modifying the directional mode used for intra prediction of the chroma block is described.

Figure 8:
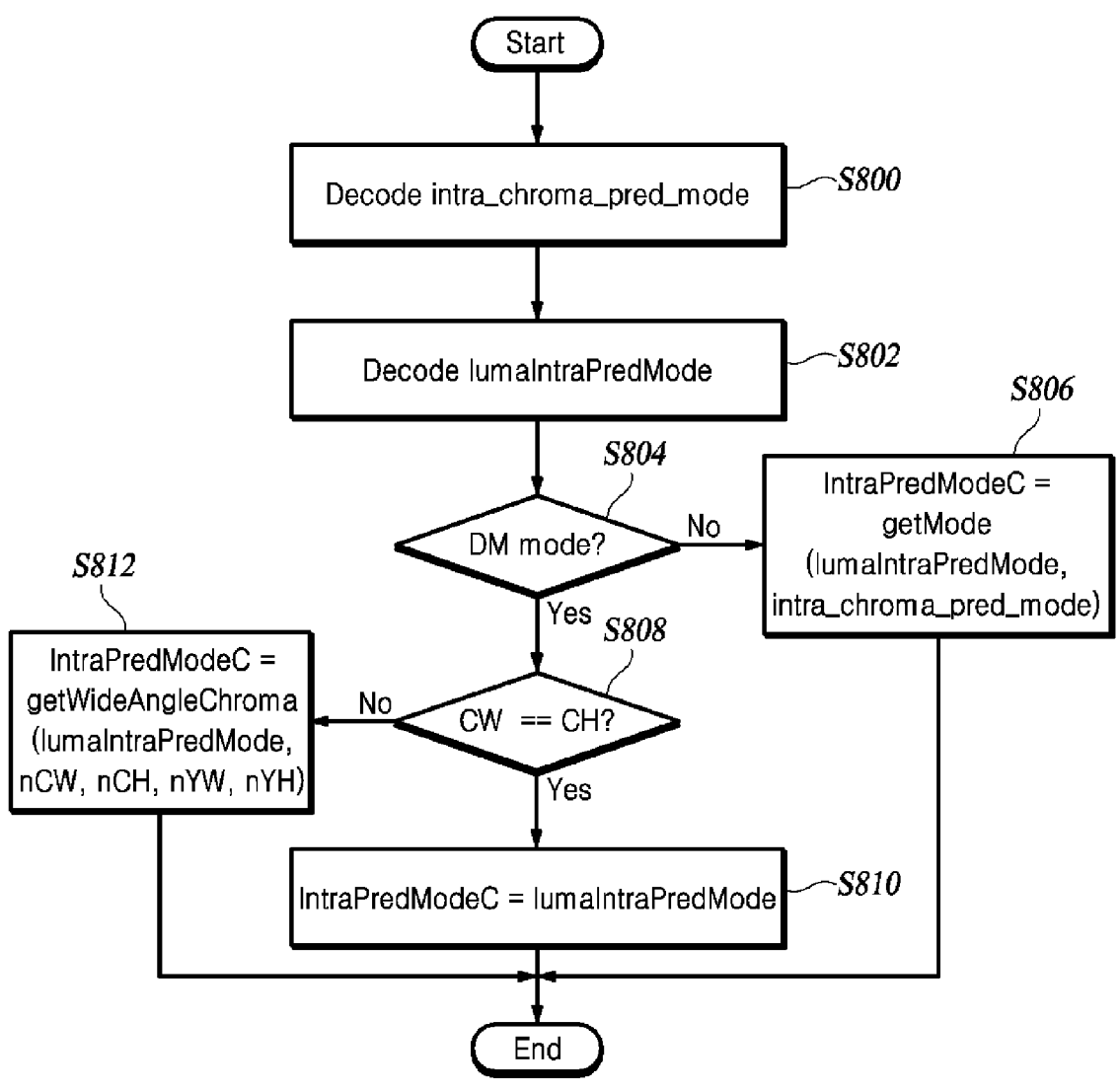
FIG. 8 is a flow diagram illustrating a method for modifying the intra prediction mode of a chroma block according to one embodiment of the present disclosure.

FIG. 8 is a flow diagram illustrating a method for modifying the intra prediction mode of a chroma block according to one embodiment of the present disclosure.

In the present embodiment, when the chroma intra prediction indicator is the DM mode, and the chroma block is rectangular, the intra predictor 542 replaces the getWideAngle( ) function illustrated in FIG. 6 to use getWideAngleChroma( ) function as illustrated in FIG. 8 (S812). In other words, the intra predictor 542 sets the intra prediction mode of the chroma block as the modified lumaIntraPred-Mode value by using the getWideAngleChroma( ) function. In this case, the getWideAngleChroma( ) function may modify the intra prediction mode using not only the horizontal nCW and vertical nCH lengths of the chroma block but also the horizontal nYW and vertical nYH lengths of the corresponding luma block.

In FIG. 8, all the steps (S800 to S810) except for the step of using the getWideAngleChroma( ) function perform the same operations as the corresponding steps in FIG. 6. Therefore, descriptions of the steps performing the same operations are omitted.

In the following description, the value of lumaIntraPred-Mode transmitted by the video encoding apparatus is denoted as 'index of intra prediction mode (or simply index).' Also, the lumaIntraPredMode value modified by transforming the original prediction mode value according to the shape of the luma block is denoted as the 'direction of the intra prediction mode (or simply the direction).' The index and direction are the same if a block is square. However, when the technique of WAIP based on the getWideAngle( ) function is applied, the index and the direction may be different.

Meanwhile, modifying the index value to the direction value may specifically mean rotating a prediction direction or changing the prediction direction to a specific value. Accordingly, the intra predictor 542 may modify the prediction mode to the direction value by adaptively rotating or changing the transmitted index value indicating the prediction direction of a block to conform to the characteristics of the aspect ratio of the block.

As described above, in one embodiment of the present disclosure, the intra predictor 542 may modify the prediction mode by rotating the direction indicated by the index. Here, this rotation angle is denoted by S. In the following description, it is assumed that a single value specifies S for the sake of convenience, but the present disclosure is not limited to the specific assumption. Other values of S may be used depending on how upper and lower ranges are defined and specific directions. In other words, according to the rotation angle S, the actual rotation direction may have several directions, such as horizontal, vertical, and diagonal directions. For example, angle S may represent the rotation of various angles, including 45 degrees, 180 degrees, 135 degrees, 225 degrees, 90 degrees, −45 degrees, −180 degrees, −90 degrees, and −45 degrees. Also, different S values may be used according to a specific pixel's value, position, or condition within the current block.

In one embodiment of the present disclosure, the intra predictor 542 may modify the prediction mode by changing the prediction mode to a specific value rather than rotating the direction.

As described above, the DM mode refers to a method in which a chroma block shares the intra prediction mode of a luma block. When the CST technique is used, the splitting structure may differ between the luma and chroma blocks. Therefore, when the DM mode is induced, the prediction direction of the chroma block should be more accurately set by considering the characteristics of the chroma block. As described above, for intra prediction, a total of 65 directional mode indices from 2 to 66 exist. Coding efficiency may be greatly improved by performing intra prediction in a finer direction from the directional mode indices. In other words, when the prediction direction is different from the optimal direction, the coding efficiency may greatly deteriorate even though the prediction direction may differ only by a fraction of an angle. Therefore, when the chroma block uses the DM mode, it is essential to more accurately set the intra prediction direction in terms of coding efficiency improvement. Also, since the DM mode is the only method in which a chroma block may use various directional predictions except for vertical and horizontal directions and is frequently selected for encoding, it is crucial to set the intra prediction direction accurately in the DM mode.

In the example of FIG. 8, after determining the correct intra prediction mode of a luma block corresponding to a chroma block, the intra predictor 542 determines the prediction mode for intra prediction of the chroma block by adaptively modifying the intra prediction mode according to the characteristics of the chroma block.

In what follows, a method for modifying a direction from the index of the intra prediction mode of a luma block, as described above, is described using the example of FIG. 9.

Figure 9:
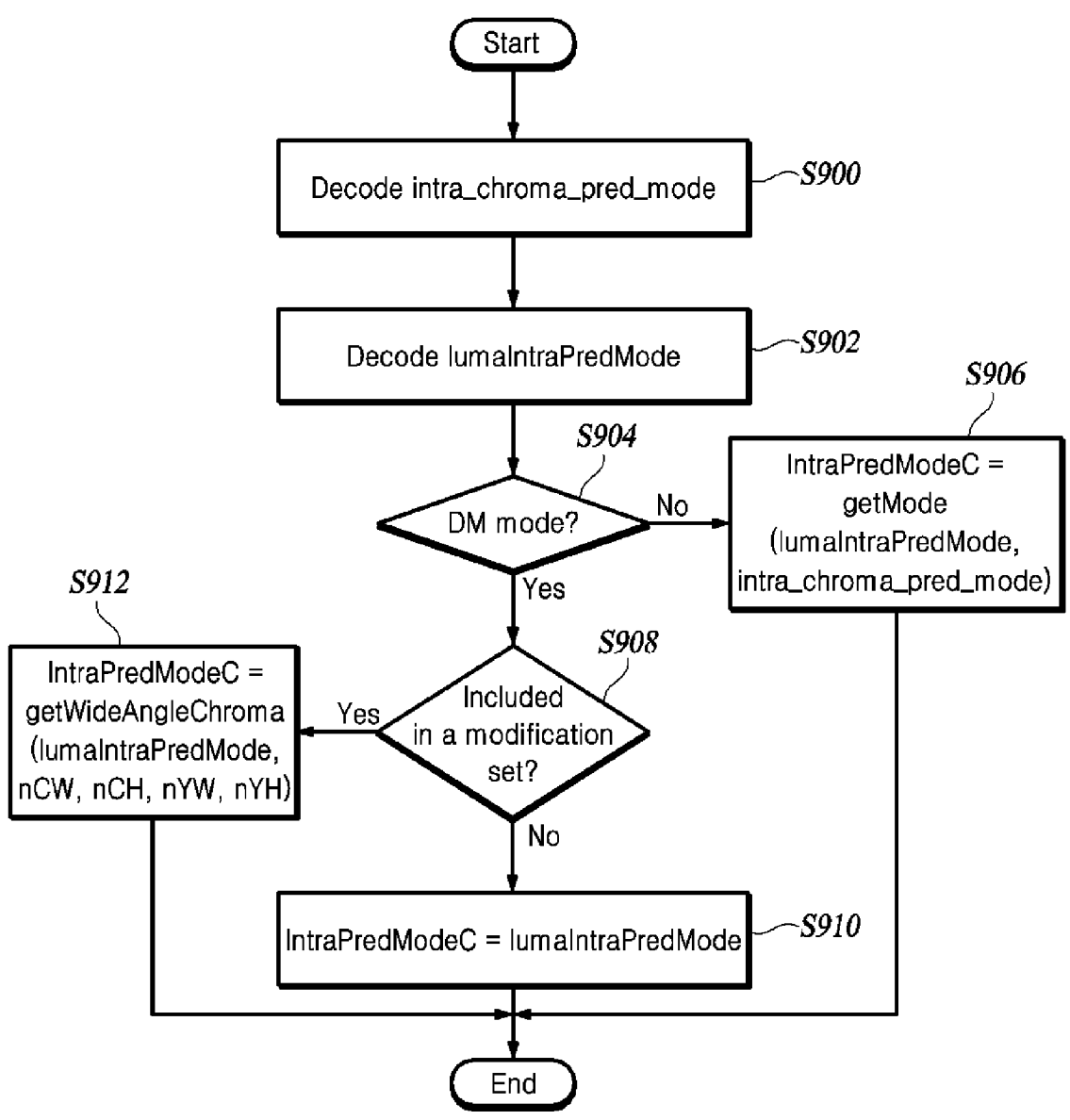
FIG. 9 is a flow diagram illustrating a method for modifying the intra prediction mode of a chroma block according to another embodiment of the present disclosure.

FIG. 9 is a flow diagram illustrating a method for modifying the intra prediction mode of a chroma block according to another embodiment of the present disclosure.

When intra_chroma_pred_mode is the DM mode, the intra predictor 542 determines whether the direction of a luma block needs to be modified. When the direction needs to be modified, the intra predictor 542 modifies the direction and sets the intra prediction mode of a chroma block as the modified direction.

Referring to FIG. 9, the steps of decoding the intra_chroma_pred_mode value to the step of setting IntraPredModeC using getMode( ) function (i.e., S900 to S906 steps) perform the same operations as the corresponding steps in FIG. 6. Therefore, descriptions of the steps performing the same operations are omitted.

To determine whether the direction of the luma block needs to be modified when intra_chroma_pred_mode is the DM mode, the intra predictor 542 checks whether the chroma block is included in a modification set (S908). When the chroma block is included in the modification set, the intra predictor 542 may modify the direction of the luma block.

Here, the aspect ratio of a chroma block may be considered as a condition for determining whether the chroma block is included in the modification set. According to the aspect ratio, chroma blocks may be classified as shown in Table 2.

TABLE 2

| Block Aspect Ratio | | Width (W) | | | | | |
|---|---|---|---|---|---|---|---|
| (W/H) | | 4 | 8 | 16 | 32 | 64 | 128 |
| Height (H) | 4 | 1 | 2 | 4 | 8 | 16 | 32 |
| | 8 | ½ | 1 | 2 | 4 | 8 | 16 |
| | 16 | ¼ | ½ | 1 | 2 | 4 | 8 |
| | 32 | ⅛ | ¼ | ½ | 1 | 2 | 4 |
| | 64 | ¹⁄₁₆ | ⅛ | ¼ | ½ | 1 | 2 |
| | 128 | ¹⁄₃₂ | ¹⁄₁₆ | ⅛ | ¼ | ½ | 1 |

In the present embodiment, the modification set may be determined as a set of chroma blocks that satisfy any of the following conditions.

(1) A case in which the value of CW/CH is not 1
(2) A case in which CW/CH>N1 or CW/CH<1/N1
(3) A case in which CW≥N2 or CH≥N3
(4) All cases illustrated in Table 2
(5) A case in which the block aspect ratio is specified by the video encoding apparatus or the video decoding apparatus Here, for conditions (2) and (3), N1, N2, and N3 may be appropriately set to 2, 4, 8, 16, 32, 64, or 128 according to a specific application. Also, CW and CH may be replaced with YW and YH, which represent the width and height of a luma block, respectively.

When a chroma block is not included in the modification set, the intra predictor 542 sets the value of the intra prediction mode IntraPredModeC of the chroma block to the value of lumaIntraPredMode, which is the intra prediction mode of the luma block (S910).

On the other hand, when the chroma block is included in the modification set, the intra predictor 542 uses a value obtained by changing lumaIntraPredMode using the getWideAngleChroma( ) function as the value of IntraPredModeC of the chroma block (S912).

In the following description, the operation of the getWideAngleChroma( ) function is described.

The getWideAngleChroma( ) function takes five input arguments. The first input argument is the intra prediction mode lumaIntraPredMode. The remaining four input arguments are the horizontal length nYW and the vertical length nYH of a luma block and the horizontal length nCW and the vertical length nCH of a chroma block.

The getWideAngleChroma( ) function may select one of the following values and set the selected value as lumaIntraDirection, a variable indicating a direction:

(1) The value outputted by the getWideAngle(lumaIntraPredMode, nYW, nYH) function,
(2) lumaIntraPredMode, and
(3) A value calculated by another method other than the above, which is the direction along which actual intra prediction is performed.

Here, lumaIntraDirection is a prediction direction indicated by lumaIntraPredMode. In particular, when WAIP is applied, lumaIntraDirection may indicate the final intra prediction direction used for actual encoding according to the description above.

Due to the shape of the chroma block, if there are no chroma reference samples in the direction indicated by lumaIntraDirection, the getWideAngleChroma( ) function may select and output one of the following values:

(1) lumaIntraDirection±S obtained by rotating lumaIntraDirection in a predetermined direction, and
(2) Diagonal direction of a chroma block close to lumaIntraDirection, including −14, −12, −10, −6, 2, 8, 12, 14, 16, 52, 54, 56, 60, 66, 72, 76, 78, and 80.

On the other hand, if the reference samples exist in the direction indicated by lumaIntraDirection, the getWideAngleChroma( ) function may output lumaIntraDirection.

Here, the diagonal direction may be determined according to the shape of the chroma block. For example, if the aspect ratio of the chroma block is ½, the diagonal direction is mode −6 or 60.

Figure 10A:
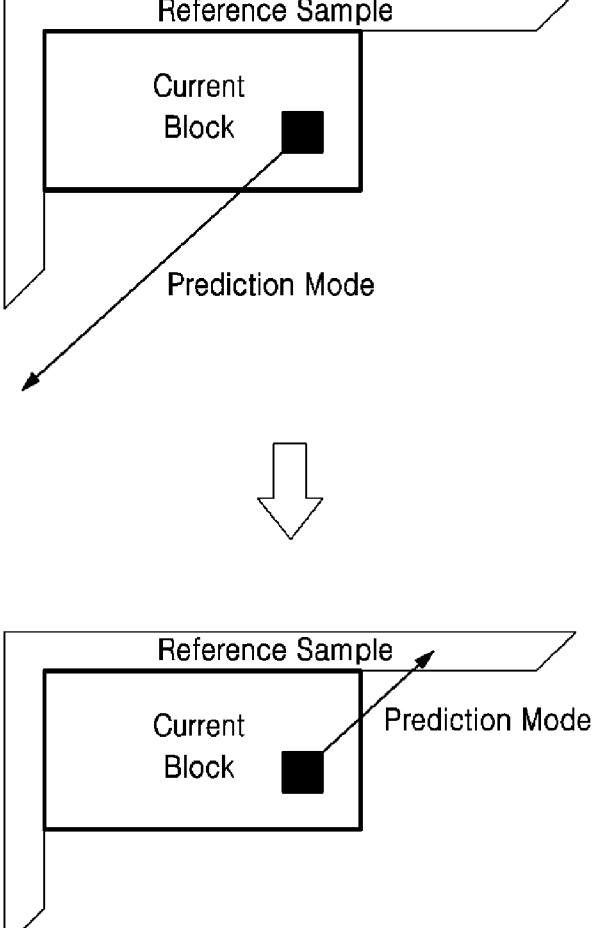
FIGS. 10A and 10B illustrate the operation of getWideAngleChroma( ) function according to one embodiment of the present disclosure.

For example, the operation of getWideAngleChroma( ) function are described for the case in which the prediction direction for intra prediction of a luma block is direction 2, the luma block is square, and the current chroma block is a horizontally long block with an aspect ratio of 2. Here, the intra predictor 542 may use the direction 66 along which the chroma block shares more area with reference samples, namely the direction generated by rotating the original direction by 180 degrees, as the prediction direction of the chroma block. Therefore, lumaIntraDirection=2, S becomes 180 degrees, and IntraPredModeC=(lumaIntraDirection+ 64). As illustrated in FIG. 10A, the intra predictor 542 may set the intra prediction direction of the chroma block as mode 66 obtained by adding 64 to 2, which is a value of lumaIntraPredMode.

Figure 10B:
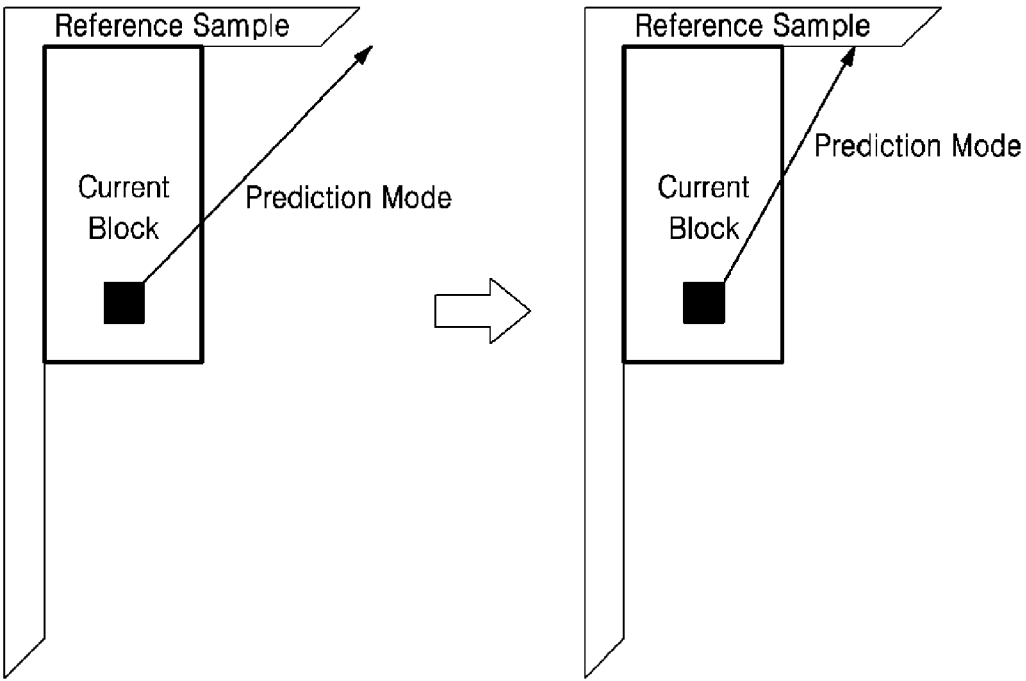

As another example, the operation of getWideAngleChroma( ) function is described for the case in which the prediction direction for intra prediction of a luma block is direction 65, the luma block is square, and the current chroma block is a vertically long block with an aspect ratio of ½. Here, the diagonal direction of the chroma block is −6 or 60, and the lumaIntraDirection is 65. Accordingly, the intra predictor 542 may set IntraPredModeC as mode 60 close to 65. In other words, as illustrated in FIG. 10B, the intra predictor 542 may set the intra prediction direction of the chroma block as mode 60, which is a diagonal direction of the chroma block.

Figure 11A:
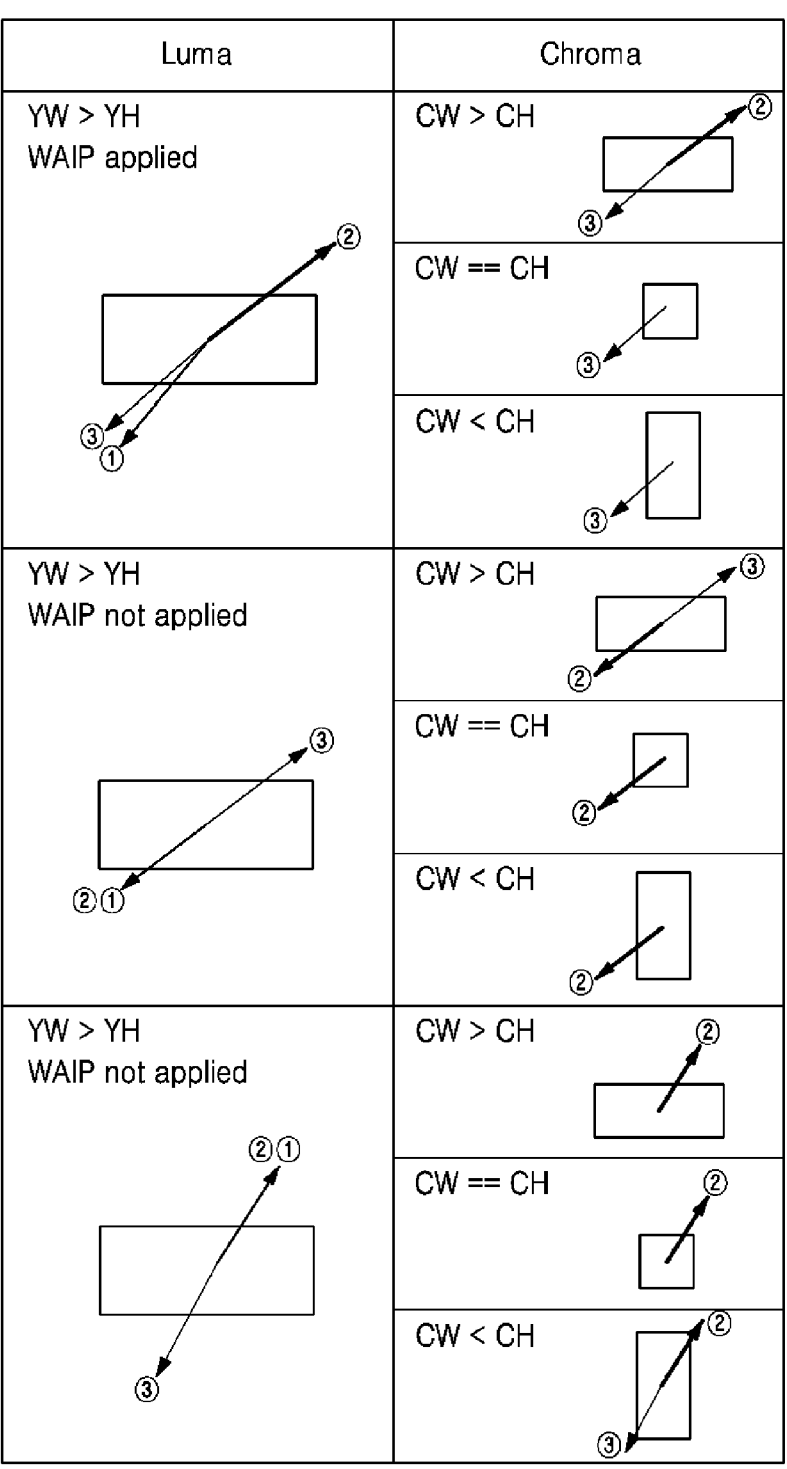
FIGS. 11A, 11B, and 11C illustrate modifying of the intra prediction mode of a chroma block according to one embodiment of the present disclosure.
Figure 11B:
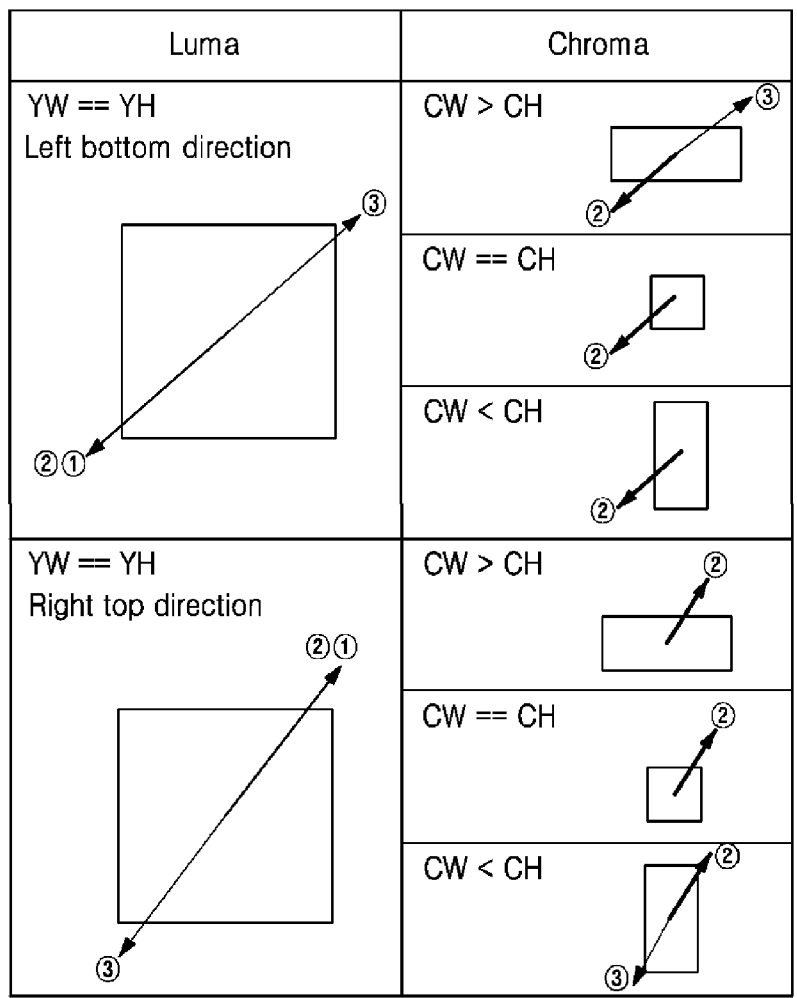
Figure 11C:
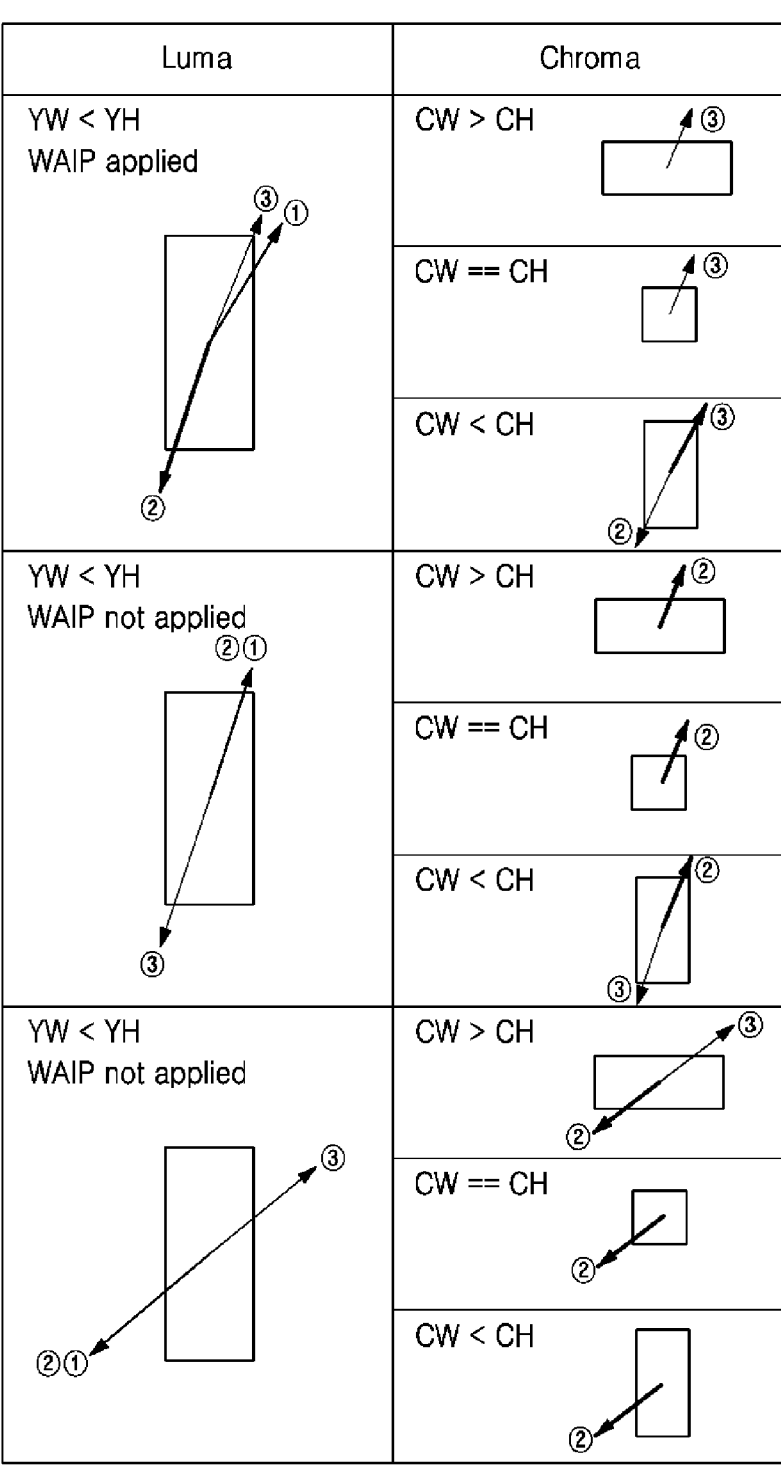

FIGS. 11A, 11B, and 11C illustrate modifying of the intra prediction mode of a chroma block according to one embodiment of the present disclosure.

As another specific example, when S=180 degrees, the operation of the getWideAngleChroma( ) function may be expressed according to the illustration of FIGS. 11A, 11B, and 11C. In the examples of FIGS. 11A, 11B, 11C, ① indicates lumaIntraPredMode, which is an intra prediction mode of the corresponding luma block included in a bitstream by the video encoding apparatus. ② indicates lumaIntraDirection, which indicates the intra prediction direction actually used for intra prediction of the corresponding block. For example, when WAIP is not used, lumaIntraPredMode and lumaIntraDirection are the same. On the other hand, when WAIP is applied, the two values may be different. Also, ③ shows the direction for which lumaIntraDirection 2 is rotated using S=180 degrees.

Accordingly, getWideAngleChroma( ) as illustrated in FIG. 9 may modify and output lumaIntraPredMode using size information of the luma block and the chroma block according to the examples of FIGS. 11A, 11B, and 11C.

In the following description, another method for modifying the intra prediction mode of a chroma block from the direction of the intra prediction mode of a luma block, as described above, is described using the example of FIG. 12.

Figure 12:
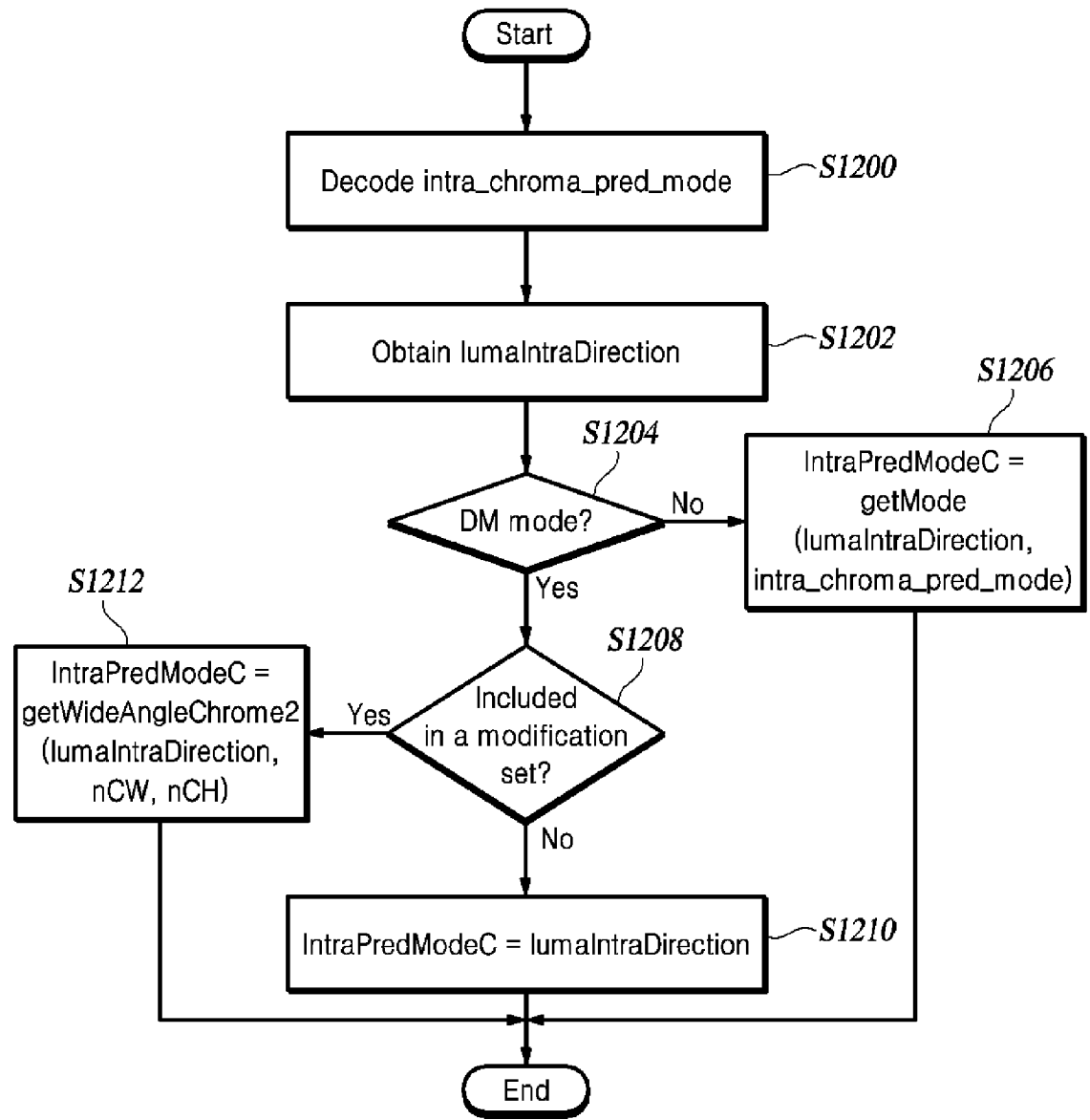
FIG. 12 is a flow diagram illustrating a method for modifying the intra prediction mode of a chroma block according to another embodiment of the present disclosure.

FIG. 12 is a flow diagram illustrating a method for modifying the intra prediction mode of a chroma block according to another embodiment of the present disclosure.

The entropy decoder 510 in the video decoding apparatus decodes intra_chroma_pred_mode (S1200).

The entropy decoder 510 obtains lumaIntraDirection (S1202). Here, lumaIntraDirection indicates the direction of the intra prediction mode of a luma block as described above.

The intra predictor 542 within the video decoding apparatus checks whether the chroma intra prediction mode indicator is the DM mode (S1204). For example, according to Table 1, when intra_chroma_pred_mode=4, the intra predictor 542 determines the intra prediction mode of the chroma block as the DM mode, otherwise the intra predictor 542 determines that the intra prediction mode is not the DM mode.

When the chroma intra prediction mode indicator is not the DM mode (No in S1204), the intra predictor 542 sets IntraPredModeC using the getMode( ) function (S1206). Here, the getMode( ) function uses lumaIntraDirection as input by replacing lumaIntraPredMode. Therefore, according to Table 1, IntraPredModeC may be set with reference to the intra_chroma_pred_mode value and the replaced lumaIntraPredMode value.

To determine whether the intra prediction mode of a chroma block needs to be modified when the chroma intra prediction mode indicator is the DM mode (Yes in S1204), the intra predictor 542 checks whether the chroma block is included in a modification set (S1208). Here, the aspect ratio of the chroma block, as shown in Table 2, may be considered as a condition for determining whether the chroma set is included in the modification set. The method for setting a modification set is the same as the method used in the illustration of FIG. 9.

When a chroma block is not included in the modification set (No in S1208), the intra predictor 542 sets the value of the intra prediction mode IntraPredModeC of the chroma block directly to the value of lumaIntraDirection, which is the direction of the intra prediction mode of a luma block (S1210).

On the other hand, when the chroma block is included in the modification set (Yes in S1208), the intra predictor 542 sets the value of IntraPredModeC of the chroma block to a value obtained by changing lumaIntraDirection using the getWideAngleChroma2( ) function (S1212).

In the following description, the operation of the getWideAngleChroma2( ) function is described.

The getWideAngleChroma2( ) function takes three input arguments. The first input argument is lumaIntraDirection, which is the direction of the intra prediction mode of a luma block. The remaining two input arguments are the horizontal length nCW and the vertical length nCH of a chroma block.

In the example of FIG. 12, since the inputted intra prediction mode is a direction rather than an index for modifying the intra prediction mode, the operation of the getWideAngleChroma2( ) function may be simplified as follows.

When no reference samples are available in the direction indicated by lumaIntraDirection due to the shape of the chroma block, the get WideAngleChroma2( ) function may select and output one of the following values:

(1) lumaIntraDirection±S obtained by rotating lumaIntra-Direction in a predetermined direction, and (2) Diagonal direction of a chroma block close to lumaIntraDirection, including −14, −12, −10, −6, 2, 8, 12, 14, 16, 52, 54, 56, 60, 66, 72, 76, 78, and 80.

On the other hand, if the reference samples exist in the direction indicated by lumaIntraDirection, the getWideAngleChroma2( ) function may output lumaIntraDirection.

The operation of the getWideAngleChroma2( ) function according to FIG. 12 is the same as that of the getWideAngleChroma( ) function, except that there is no process of calculating the lumaIntraDirection.

Figure 13:
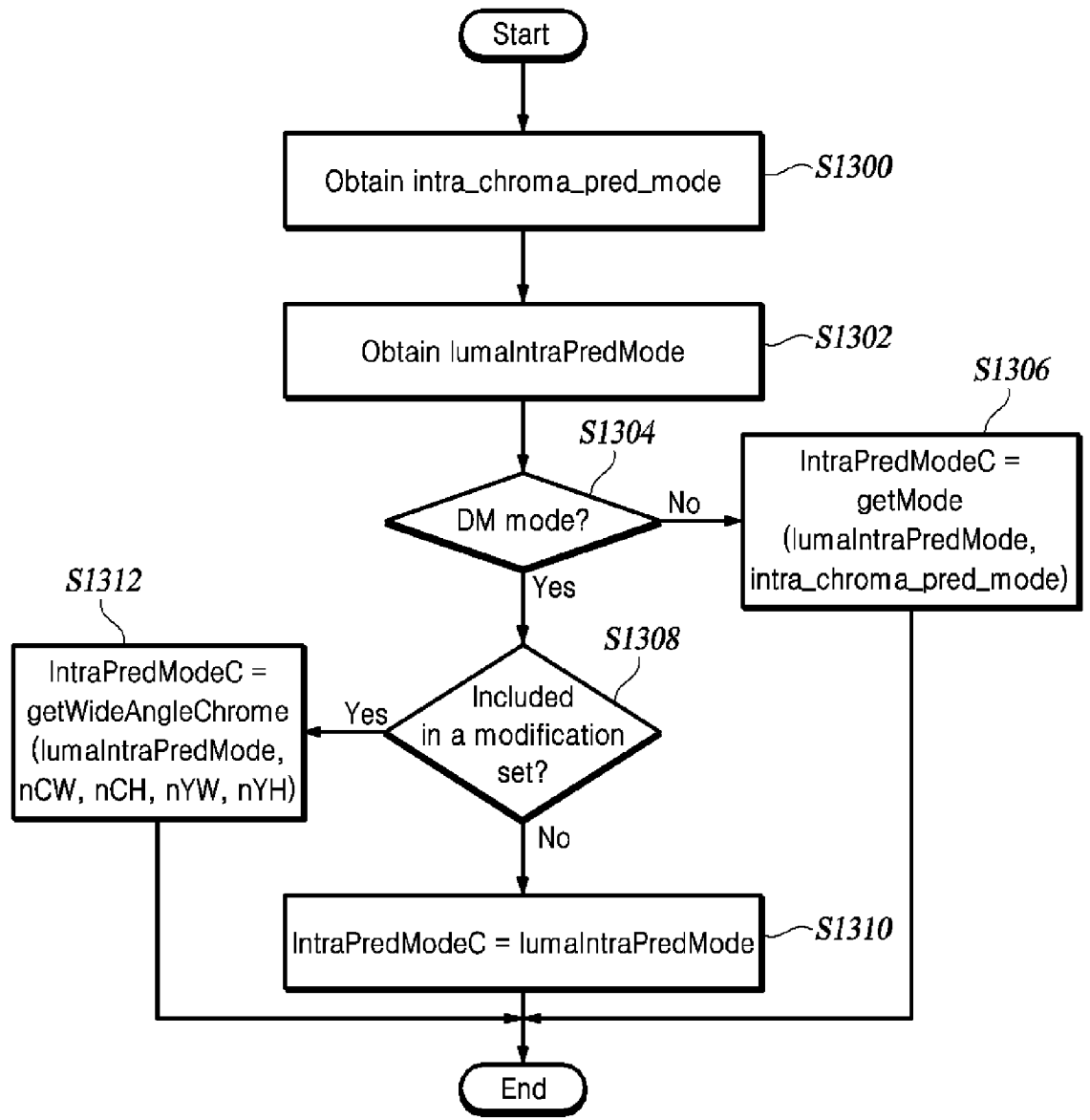
FIG. 13 is a flow diagram illustrating a method for modifying the intra prediction mode of a chroma block by a video encoding apparatus according to another embodiment of the present disclosure.

FIG. 13 is a flow diagram illustrating a method for modifying the intra prediction mode of a chroma block by a video encoding apparatus according to another embodiment of the present disclosure.

As described above, the method for setting the intra prediction mode of a chroma block according to the present embodiment may be performed by the intra predictor 122 of the video encoding apparatus for bit-rate distortion analysis. At this time, the video encoding apparatus searches for optimal intra_chroma_pred_mode and lumaIntraPredMode during the bit-rate distortion analysis. In the search process, the intra predictor 122 obtains intra_chroma_pred_mode and lumaIntraPredMode S1300, S1302.

In the illustration of FIG. 13, the step of determining whether the mode is the DM mode to the step of setting IntraPredModeC (i.e., S1304 to S1312 steps) perform the same operations as the corresponding steps illustrated in FIG. 9. Therefore, descriptions of the overlapping steps are omitted.

The video encoding apparatus encodes the optimal intra_chroma_pred_mode and lumaIntraPredMode values according to the bit-rate distortion analysis into a bitstream and transmits the encoded values to the video decoding apparatus.

Although the steps in the respective flowcharts are described to be sequentially performed, the steps merely instantiate the technical idea of some embodiments of the present disclosure. Therefore, a person having ordinary skill in the pertinent art could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium includes, for example, all types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, one of ordinary skill should understand that the scope of the present disclosure is not to be limited by the above explicitly described embodiments but by the claims and equivalents thereof.

REFERENCE NUMERALS

122: intra predictor
510: entropy decoder
542: intra predictor

What is claimed is:

1. An intra prediction method performed by a video decoding apparatus, the method comprising:

decoding, from a bitstream, a chroma intra prediction mode indicator indicating that a prediction mode of a chroma block is a DM mode;

decoding a luma intra prediction mode from the bitstream, wherein the luma intra prediction mode represents an intra prediction mode of a luma block spatially corresponding to the chroma block; and deriving a chroma intra prediction mode for the chroma block from the luma intra prediction mode, by modifying the luma intra prediction mode based on an aspect ratio of the luma block and an aspect ratio of the chroma block, wherein, when the prediction mode of the chroma block is the DM mode, deriving the chroma intra prediction mode comprises:

determining a luma prediction direction based on the luma intra prediction mode, and the aspect ratio of the luma block; and determining the chroma intra prediction mode based on the luma prediction direction, and the aspect ratio of the chroma block, wherein, when at least one chroma reference sample in a chroma prediction direction indicated by the chroma intra prediction mode is unavailable, the chroma intra prediction mode is set to an intra prediction mode that is close to the chroma intra prediction mode and has a direction pointing to available chroma reference samples.

2. The method of claim 1, wherein the luma prediction direction is determined by adding a first predetermined value to the luma intra prediction mode when the horizontal length of the luma block is longer than the vertical length of the luma block, and the luma intra prediction mode is included in a first predetermined range.

3. The method of claim 1, wherein the luma prediction direction is determined by subtracting a second predetermined value from the luma intra prediction mode when the horizontal length of the luma block is shorter than the vertical length of the luma block, and the luma intra prediction mode is included in a second predetermined range.

4. An intra prediction method performed by a video encoding apparatus, the method comprising:

determining that a prediction mode of a chroma block is a DM mode;

obtaining a luma intra prediction mode, wherein the luma intra prediction mode represents an intra prediction mode of a luma block spatially corresponding to the chroma block; and deriving a chroma intra prediction mode, for the chroma block from the luma intra prediction mode, by modifying the luma intra prediction mode based on an aspect ratio of the luma block and an aspect ratio of the chroma block, wherein deriving the chroma intra prediction mode comprises:

determining a luma prediction direction based on the luma intra prediction mode, and the aspect ratio of the luma block; and determining the chroma intra prediction mode based on the luma prediction direction, and the aspect ratio of the chroma block, wherein, when at least one chroma reference sample in a chroma prediction direction indicated by the chroma intra prediction mode is unavailable, the chroma intra prediction mode is set to an intra prediction mode that is close to the chroma intra prediction mode and has a direction pointing to available chroma reference samples.

5. A method for providing a video decoding apparatus with video data, the method comprising:

encoding the video data into a bitstream; and transmitting the bitstream to the video decoding apparatus, wherein encoding the video data comprises:

determining that a prediction mode of a chroma block is a DM mode;

obtaining a luma intra prediction mode, wherein the luma intra prediction mode represents an intra prediction mode of a luma block spatially corresponding to the chroma block; and generating a chroma intra prediction mode for the chroma block from a luma prediction mode, by modifying the luma intra prediction mode based on an aspect ratio of the luma block and an aspect ratio of the chroma block, wherein deriving the chroma intra prediction mode comprises:

determining a luma prediction direction based on the luma intra prediction mode, and the aspect ratio of the luma block; and determining the chroma intra prediction mode based on the luma prediction direction, and the aspect ratio of the chroma block, wherein, when at least one chroma reference sample in a chroma prediction direction indicated by the chroma intra prediction mode is unavailable, the chroma intra prediction mode is set to an intra prediction mode that is close to the chroma intra prediction mode and has a direction pointing to available chroma reference samples.

* * * * *